US009894418B1

(12) United States Patent
Scott (10) Patent No.: US 9,894,418 B1
(45) Date of Patent: Feb. 13, 2018

(54) CUDDLE VIDEO BROADCAST SYSTEM AND METHOD

(71) Applicant: Resna Scott, Laurelton, NY (US)

(72) Inventor: Resna Scott, Laurelton, NY (US)

(*) Notice: Subject to any disclaimer, the term of this patent is extended or adjusted under 35 U.S.C. 154(b) by 0 days.

(21) Appl. No.: 15/172,140

(22) Filed: Jun. 2, 2016

Related U.S. Application Data

(60) Provisional application No. 62/170,664, filed on Jun. 3, 2015.

(51) Int. Cl.
*H04N 21/482* (2011.01)
*H04N 21/4788* (2011.01)
*H04N 21/61* (2011.01)
*H04N 21/41* (2011.01)

(52) U.S. Cl.
CPC ....... *H04N 21/482* (2013.01); *H04N 21/4126* (2013.01); *H04N 21/4788* (2013.01); *H04N 21/6175* (2013.01)

(58) Field of Classification Search
CPC .................................................. H04N 21/482
See application file for complete search history.

(56) References Cited

U.S. PATENT DOCUMENTS

| 6,243,772 B1* | 6/2001 | Ghori | H04N 9/641 348/552 |
| 2008/0270449 A1* | 10/2008 | Gossweiler | G06F 17/30817 |
| 2012/0144416 A1* | 6/2012 | Wetzer | H04N 21/25816 725/14 |
| 2015/0172743 A1* | 6/2015 | Itagaki | G08C 17/00 725/56 |

OTHER PUBLICATIONS

WO 2009/109976 A2, Distributing Internet Channels to a Media Viewer.*

* cited by examiner

*Primary Examiner* — Nasser Goodarzi
*Assistant Examiner* — Adil Ocak
(74) *Attorney, Agent, or Firm* — RG Patent Consulting, LLC; Rachel Gilboy (57) ABSTRACT

A Cuddle (CUD) system for a user mobile device that allows a user to view broadcast stations worldwide. In this system, a CUD module icon on a screen display is configured to connect to a CUD module. The CUD module interactively receives from the user selections including genre of movies or shows, news, television stations, sports from the one or more broadcast stations. The CUD module selectively interacts with and modifies functionality of an electronic processing unit responsible for functionality of a transceiver module and/or a screen display module to select and automatically display a selected number of one or more broadcast selections from one or more CUD module selections on the user mobile device.

1 Claim, 12 Drawing Sheets

CUDDLE VIDEO BROADCAST SYSTEM AND METHOD

CROSS-REFERENCE TO RELATED APPLICATION

The present application is related to and claims priority from prior provisional application serial number 62/170,664, filed Jun. 3, 2015, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of mobile applications (apps) and more specifically relates to the Cuddle mobile application.

2. Description of the Related Art

A mobile app is a computer program designed to run on smartphones, tablet computers and other mobile devices. Mobile apps were originally offered for general productivity and information retrieval, including email, calendar, contacts, and stock market and weather information. The explosion in number and variety of apps made discovery a challenge, which in turn led to the creation of a wide range of review, recommendation, and curation sources, including blogs, magazines, and dedicated online app-discovery services. Many new apps are desirable to provide convenient solutions to the users.

Various attempts have been made to solve the problems which may be found in the related art but have thus far been unsuccessful. A need exists for a reliable mobile application to avoid many or if not most of the above-mentioned problems.

BRIEF SUMMARY OF THE INVENTION

In view of the foregoing disadvantages inherent in the known art, the present invention provides a novel mobile app. The general purpose of the present invention, which will be described subsequently in greater detail, is to provide Cuddle mobile application, a simple, user friendly application which allows the user to view any broadcast station, anywhere around the world including news, sports, television shows and movies. The features of the invention which are believed to be novel are particularly pointed out and distinctly claimed in the concluding portion of the specification. These and other features, aspects, and advantages of the present invention will become better understood with reference to the following drawings and detailed description.

A Cuddle (CUD) system is disclosed for a user mobile device that allows a user to view broadcast stations worldwide. In this system, a CUD module icon on a screen display is configured to connect to a CUD module. The CUD module interactively receives from the user selections including genre of movies or shows, news, television stations, sports from the broadcast stations. The CUD module selectively interacts with and modifies functionality of an electronic processing unit responsible for functionality of a transceiver module and/or a screen display module to select and automatically display a selected number of one or more broadcast selections from one or more CUD selections on the user mobile device.

A method of a vison air system is disclosed for a user mobile device that allows a user to view broadcast stations worldwide. The method includes the steps of: activating CUD module icon on a screen display; receiving interactively by the CUD module from the user selections including genre of movies or shows, news, television stations, sports from the one or more broadcast stations; selectively interacting by a CUD module with and modifying functionality of an electronic processing unit responsible for functionality of a transceiver module and/or a screen display module to select and automatically display a selected number of one or more broadcast selections from one or more CUD selections on the user mobile device.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Cuddle (CUD) system, e.g., CUD module icon and system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a mobile app and more particularly to Cuddle mobile application, creating a functional tangible use for the end-user.

The Cuddle is a simple, user friendly application which allows the user to view any broadcast station, anywhere around the world including news, sports, television shows and movies.

Referring now to the drawings FIGS. 1-5, showing operation of Cuddle mobile application includes a player that a user would utilize to activate touch the Cuddle app icon. The application would quickly download and the user would select from either a genre of movies/shows (i.e. comedy, drama), news (i.e. weather, local), sports (seasonal, commentary), or plays. The user would select the location (country/city). According to the category and location the user has chosen, a list of options would appear on the screen display they may view.

Figure 4:
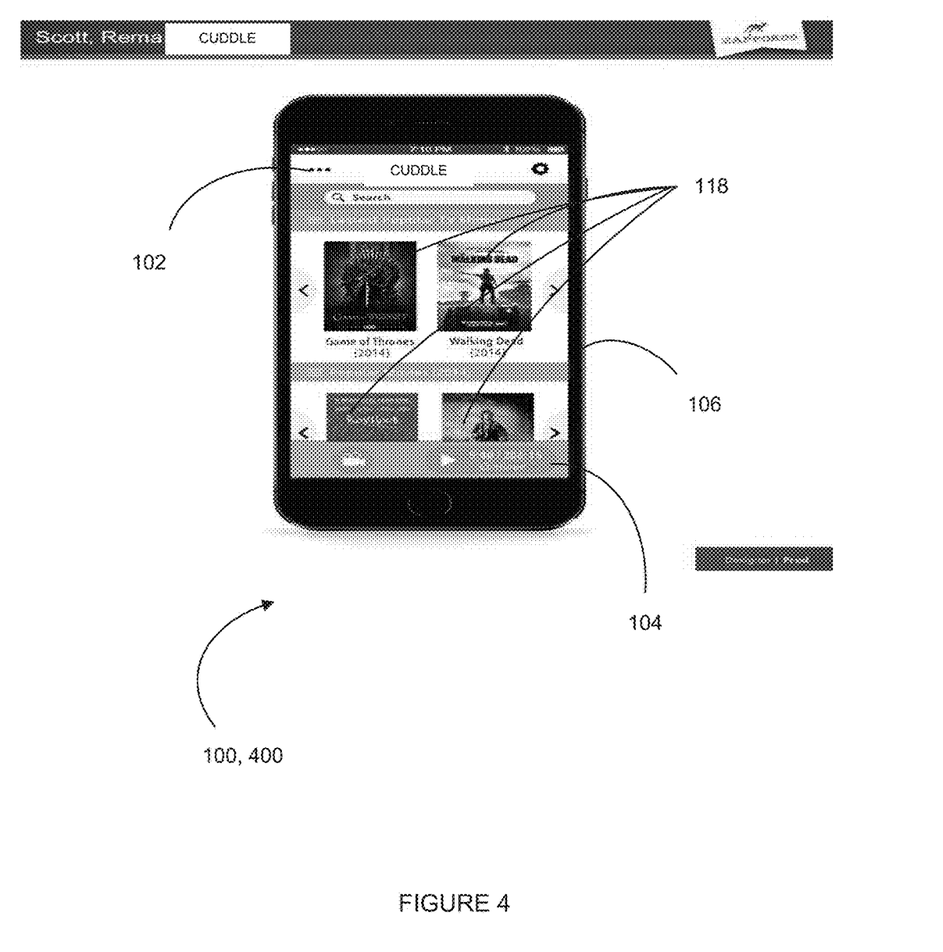
FIG. 4 illustrates screen shot provided by CUD module icon and system 100, 400 downloaded on mobile device (mobile phone) according to an embodiment of the present invention of FIG. 1.
Figure 6:
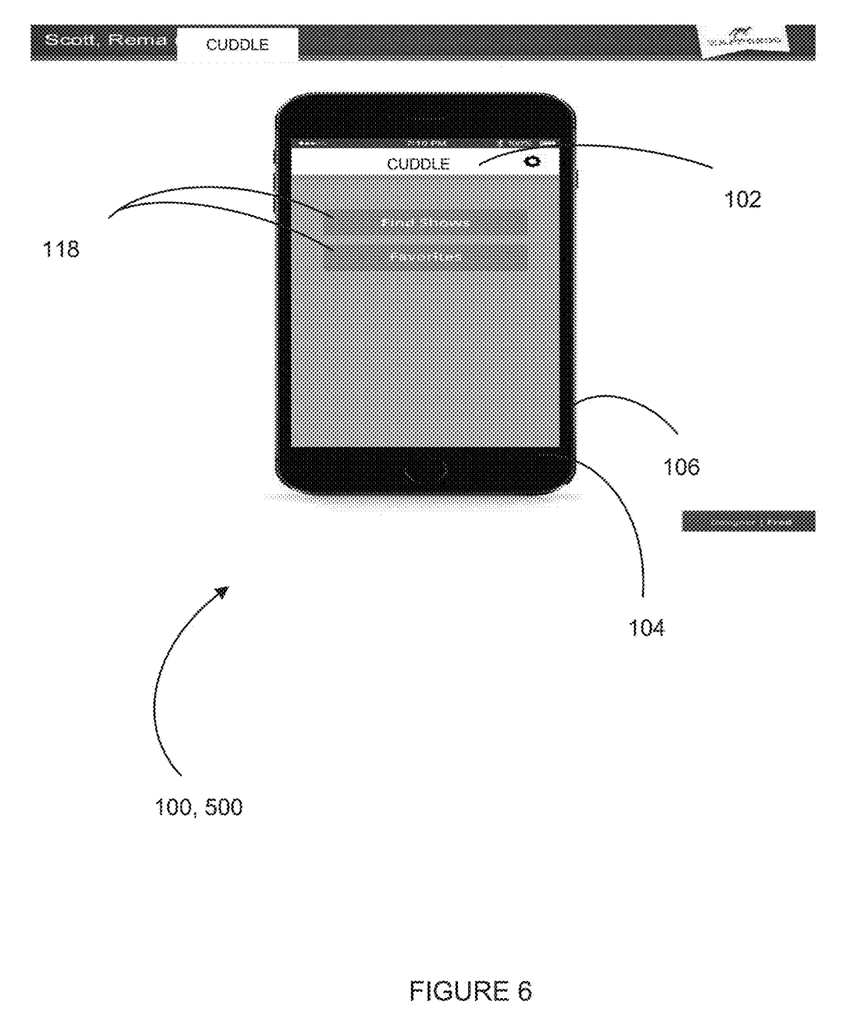
FIG. 6 illustrates screen shot provided by CUD module icon and system 100, 600 downloaded on mobile device (mobile phone) according to an embodiment of the present invention of FIG. 1.
Figure 7:
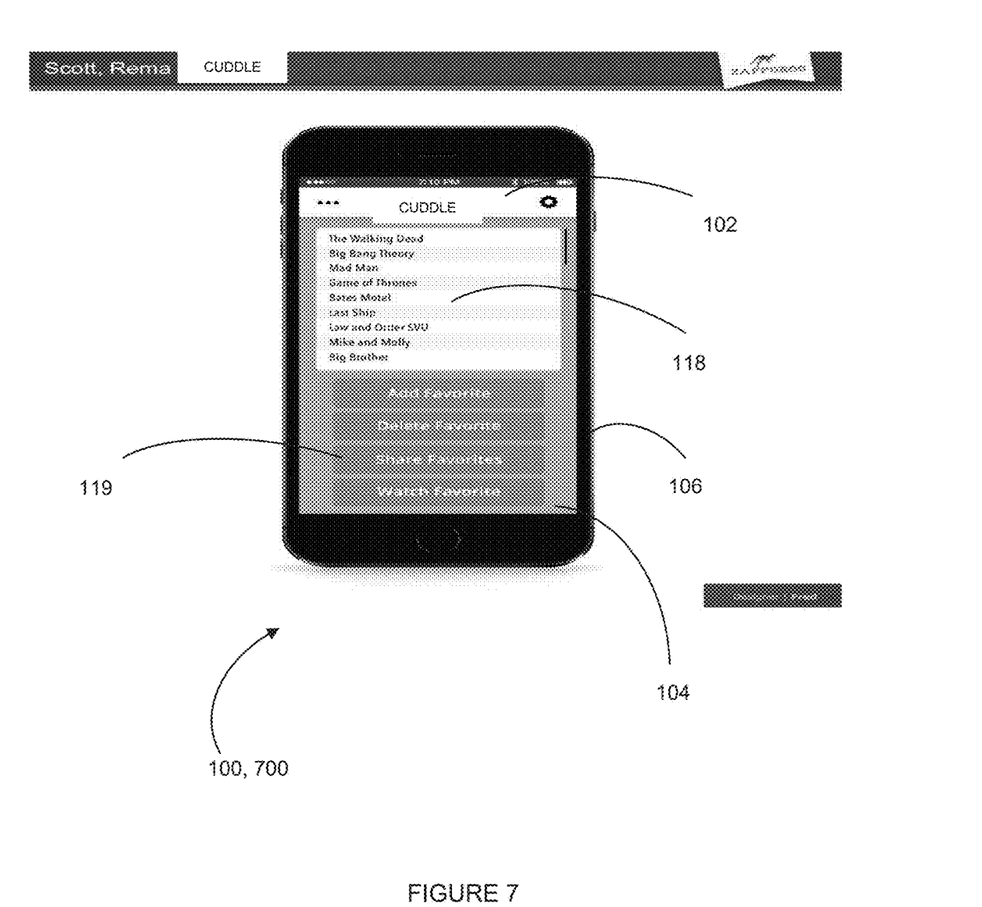
FIG. 7 illustrates screen shot provided by CUD module icon and system 100, 700 downloaded on mobile device (mobile phone) according to an embodiment of the present invention of FIG. 1.

Advantageously, this application (app) will provide the following benefits for all users: for game players, the app provides the opportunity to watch whatever form of media the user wants, e.g., see FIGS. 4 and 7; for home or mobile users, the app is like having a movie theatre, playhouse, sports arena or television station right at hand: the user has full control of viewing choice with: clear reception (HD capability), variety of channels, unique/diverse programming, fast and easy to edit, and custom search engine, e.g., see FIGS. 4, 6, and 7.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

Figure 1:
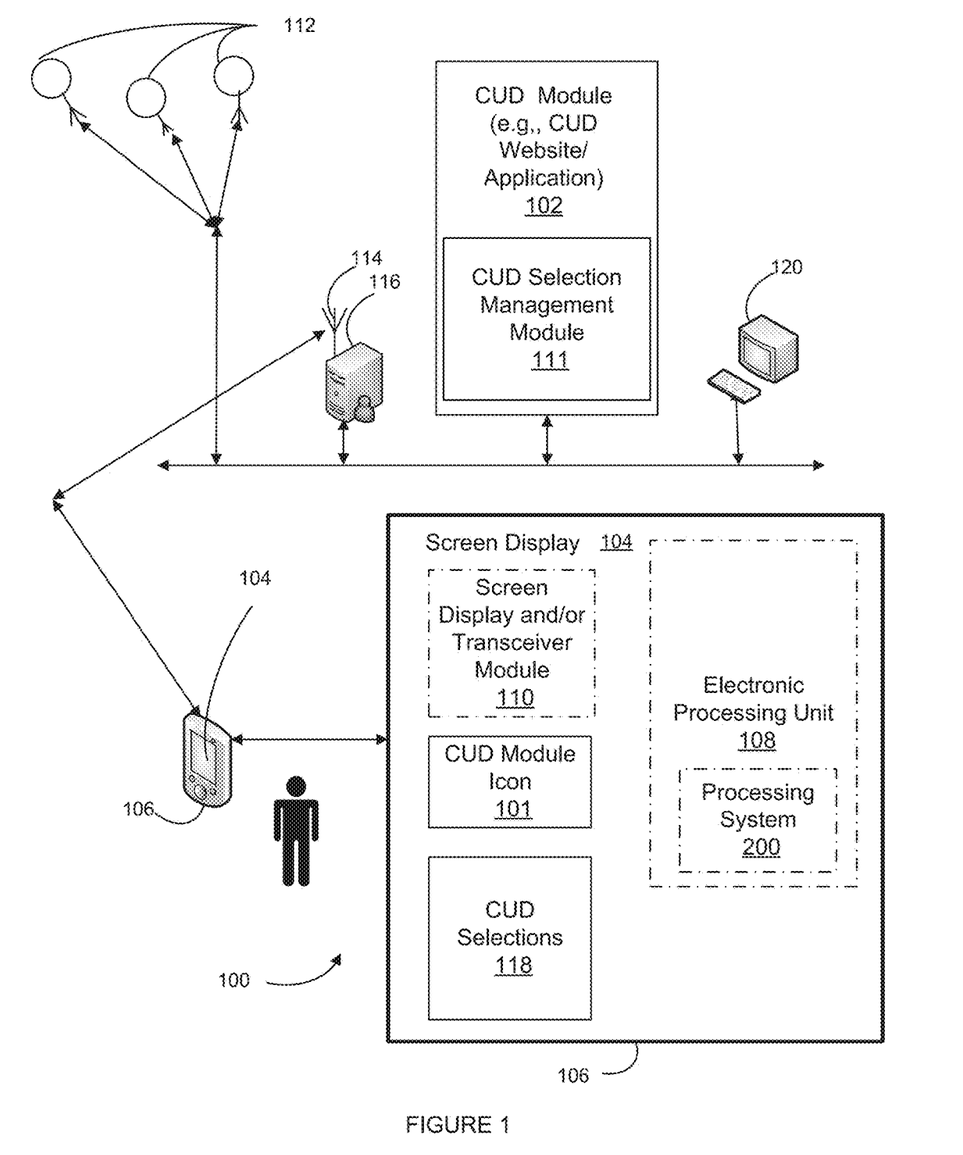
FIG. 1 shows a functional system diagram illustrating CUD module icon and system 100 according to an embodiment of the present invention.

FIG. 1 shows a functional system diagram illustrating 100 according to an embodiment of the present invention.

Referring to the drawings by numerals of reference there is shown in FIG. 1; Cuddle (CUD) system 100 for a user mobile device that allows a user to view broadcast stations worldwide 100 on a user mobile device 106. For example, a user goes to the CUD website, e.g., after downloading software application mobile device, and signs up to obtain an account, e.g., adding information including for example, their name, location, and city on a screen display 104 on a user mobile device 106.

Furthermore, in system 100, CUD module 102 is accessible through CUD module icon 101 on screen display 104. In system 100, CUD module 102 interactively receives from the user selections including genre of movies or shows, news, television stations, sports from the one or more broadcast stations. CUD module 102 selectively interacts with and modifies functionality of electronic processing unit 108, e.g., read only memory 202, central processing unit 206, video processing unit 104, computer circuitry, screen display driver 104 or the like, responsible for playability and functionality of transceiver and/or a screen display module or application 110 on user mobile device 106. Upon activation by user toggling "on", e.g., on position, CUD module icon 101 communicates with CUD module 102 to select and automatically display a selected number of one or more broadcast selections from one or more CUD selections 118 on screen display 104 responsive to selection of screen display module, transceiver module or application 110.

Advantageously, CUD module 102, when activated using the CUD module icon 101, communicates electrical signals that modify, enhance, and increase functionality of transceiver module or screen display module or application 110. Further, CUD module 102 provides CUD selection management module 111. CUD selection management module 111 provides user of the user mobile device 106 CUD selections 118 on the user mobile device 106. CUD module 102 communicates electronic signals, for example, to electronic processing units 108 and/or electronic drivers or modules of screen display 104 that communicates CUD selections 118 based on user choices. In another example, CUD module 102 communicates, for example, through CPU 206 and display drivers 104 and/or modules one or more CUD selections 118 user mobile device 106, e.g., utilizing CUD module 102, CUD module icon 101, electronic processing unit 108, and CUD selections 118.

As such, CUD module 102 provides one or more CUD selections 118 on screen display 104 on the mobile phone 106. In some embodiments, CUD module 102 selectively interacts with and modifies functionality of electronic processing unit 108, e.g., CPU 202, screen device drivers 104, and the like, responsible for functionality of screen module, transceiver module, or application 110 on user mobile device 106 including CUD module 102 modifies central and/or auxiliary processing unit instruction sets, e.g., instructions to CPU 202, screen device drivers 104, providing CUD selection management module 111 on screen display 104 built-in user mobile device 106 responsive to a selection by a user.

In some embodiments, comprising the user communicates through the CUD module 102 search, e.g., see FIGS. 4, 6, 7, for shows available for streaming by looking through various networks. For instance, the user streams current shows and sporting events currently streamed by major networks including CBS, NBC, CNN, and ESPN and location including a country and a city for downloading.

The CUD module 102 selectively interacts with and modifies functionality of at least one electronic processing unit 108 responsible for functionality of screen display module on the user mobile device includes the CUD module 102 modifying central and auxiliary processing unit instruction sets for a CUD selection management module 111 on the screen display 104 of the user mobile device responsive with the selection by the user.

In some embodiments, CUD selections 118 are mobile device specific and can be modified in accordance with one or more user instructions or in accordance with instructions or coding from CUD module 102. For example, user may specify one or more CUD selections 118. For example, electronic processing unit 108 includes any or all the following: central processing unit (CPU) 206, device driver, display driver 104, electronic display driver 104, or the like. For instance, the CUD selection management module 111 includes a screen menu, the screen menu provides includes for user moving one or more fingers up, down, side to side or around to select one or more CUD selections 118.

For example, CUD selection management module 111 includes screen menu display including one or more CUD selections 118. Screen menu provides for user moving one or more fingers up, down, side to side and around screen menu display to select one or more CUD selections 118. In one example, the one or more CUD selections 118 include adds a Share with Social Media Button on the Screen 119, e.g., see FIG. 7, wherein the user can share what they are currently watching across social media.

In yet another example, wherein the one or more CUD selections include a Cuddle™ logo CUD webpage including any or all the following: a favorite's books, settings, television shows, music, books, and notification. In yet another example, the one or more CUD selections 118 are communicated wirelessly 114 through computer 116 with satellite communication or satellite link 112 to the user mobile device 106. In some embodiments, CUD selections 118 provide itemized information and other pertinent data relevant to one or more CUD selections 118 selected for the user on the user mobile device 106.

As disclosed, the present invention is a mobile module or application designed to run on smartphones, tablet computers and other mobile devices. This module or application typically operated by the owner of the mobile operating system, such as the Apple App Store, Google Play, Windows Phone Store, and BlackBerry App World. Frequently, they are downloaded from the platform to a target device, such as an iPhone, Android, or Windows phone and downloadable to laptops or desktop computers.

Advantageously, CUD module icon and system comprises a novel product offering consumers a practical solution to the aforementioned challenges. Furthermore, CUD module icon and system is a specially configured software module or application for use with cellular smartphones and handheld tablet computers, with module or application that can be utilized when operating screen display options on one's electronic device.

Advantageously, CUD module icon and system enables users to effortlessly select or modify broadcast selections from CUD selection management module in a down, back and forth with ease. According, this software module or application is a practical alternative including CUD module icon and system that enhance mobile device screen display features, and improving user/person mobile device experience in the home or on the go.

Figure 2:
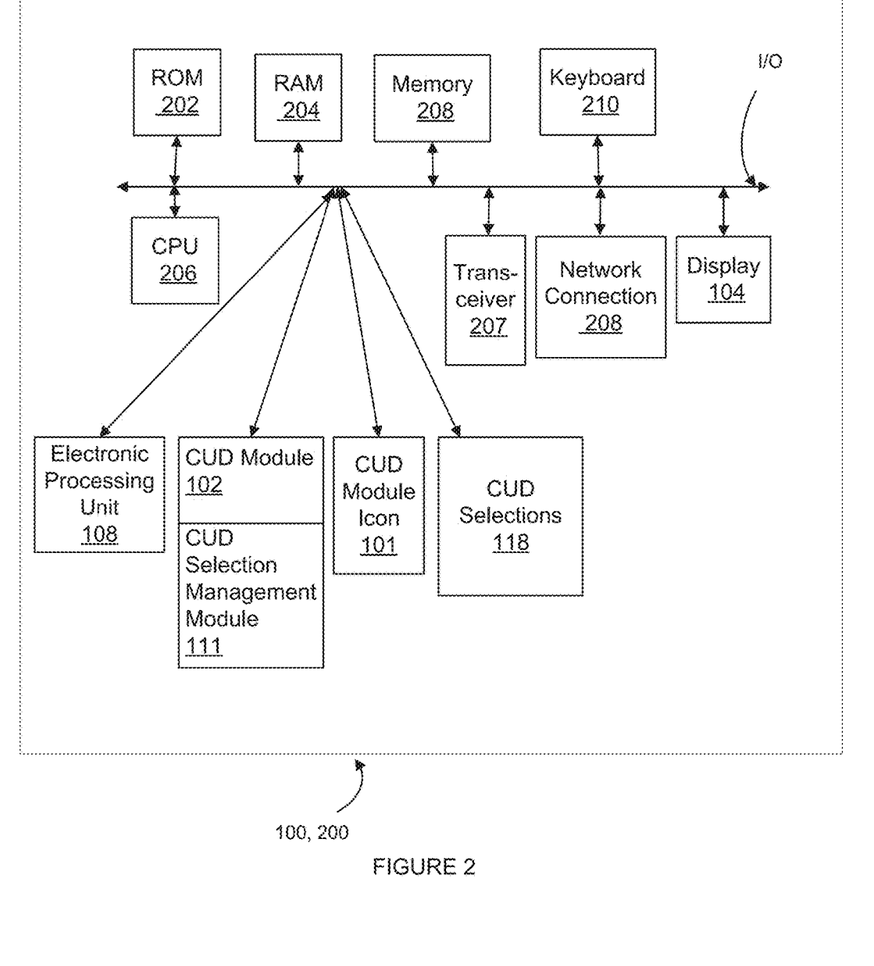
FIG. 2 illustrates a block diagram of processing system 200 illustrating interaction between CUD module icon and system 100-1200 and mobile device 200 according to an embodiment of the present invention of FIG. 1.

FIG. 2 illustrates an exemplary embodiment of processing system 200 illustrating interaction between CUD module icon and system(s) 100-1100 on a user mobile device 106 according to an embodiment of the present invention of FIG. 1.

Referring now to FIG. 2, an exemplary embodiment of processing system 200 is disclosed. Device(s) connect(s) to network in FIG. 1 including a processing system. Processing system 200 has a central processing unit (CPU) 206 that may be a processor, microprocessor, or any combination of processors and microprocessor that executes instructions stored in memory to perform an application. CPU 206 connects memory bus and Input/Output bus. A non-volatile memory, such as, Read Only Memory (ROM) 202 is connected to CPU 206 via memory bus 214. ROM 202 stores instructions for initialization and other systems command Volatile memory such as Random Access Memory (RAM) 204, for example, DRAM, and/or SDRAM, connects to CPU 206 via memory bus. RAM, DRAM, SDRAM or the like stores instructions for processes that are executed and data operated on by one or more executed processes. Peripheral devices include memory, display, I/O device, and network connection device connected to CPU 206 via I/O bus. I/O bus carries data between user mobile device 106, e.g., CUD module 102, CUO selection management module 111, CUD module icon 101, electronic processing unit 108, and CUD selections 118, and the like, CPU 206, Transceiver unit 207, Memory 208, e.g., read/write compact discs (CDs) and magnetic disk drives, stores data unto a media. Display 104 is a monitor and/or display and associated drivers, including electronic drivers and electronic modules, that convert data to a display. I/O device is a keyboard, a pointing device or other device that may be used by a user to input data. Network device is a modem or Ethernet that connects processing system 200 to a network.

Figure 3:
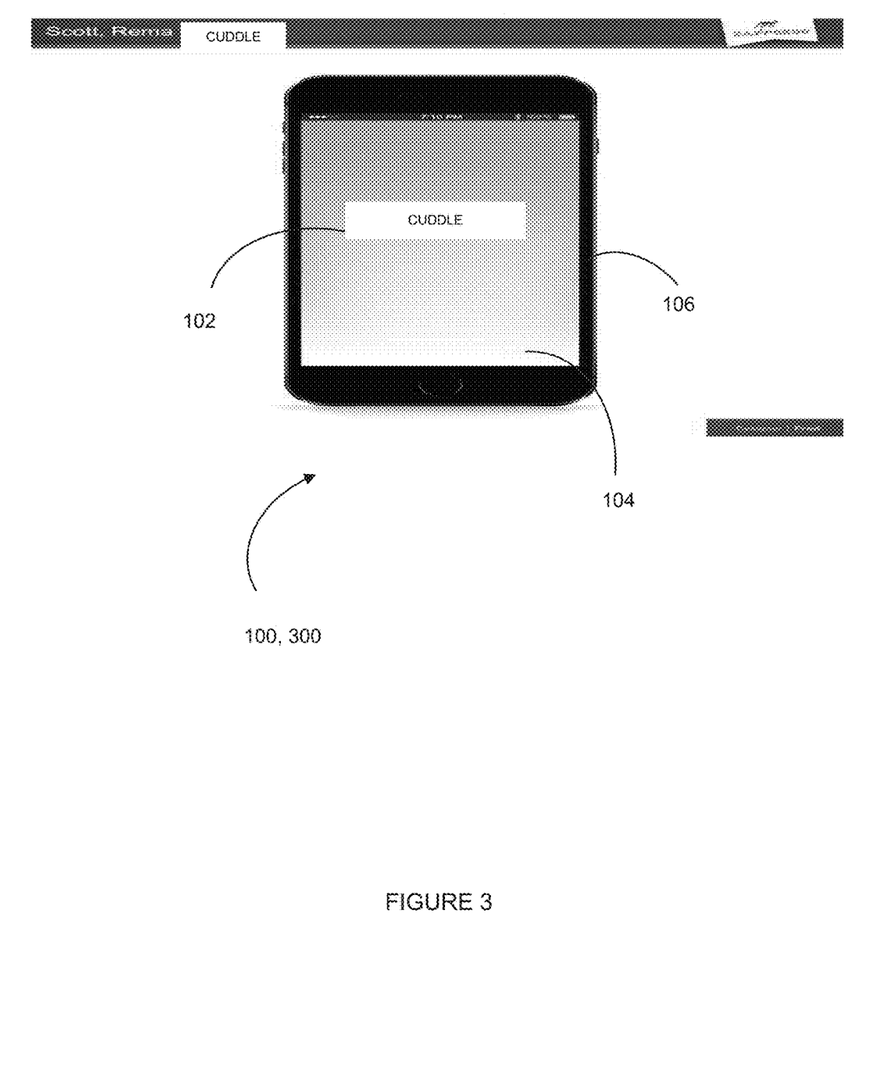
FIG. 3 illustrates screen shot provided by CUD module icon and system 100, 300 downloaded on mobile device (mobile phone) according to an embodiment of the present invention of FIG. 1.

Referring to FIG. 3, screen shot provided by CUD module icon and system 100, 300 downloaded on mobile device (mobile phone) according to an embodiment of the present invention of FIG. 1.

Referring to FIG. 4, screen shot provided by CUD module icon and system 100, 400 downloaded on mobile device (mobile phone) according to an embodiment of the present invention of FIG. 1.

Figure 5:
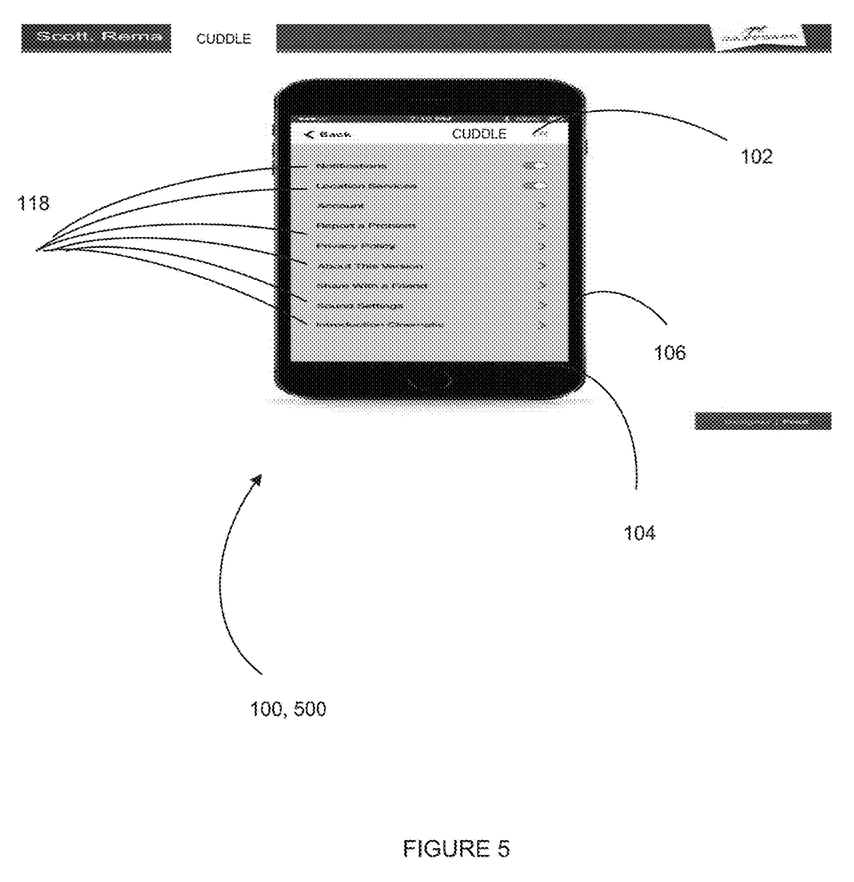
FIG. 5 illustrates screen shot provided by CUD module icon and system 100, 500 downloaded on mobile device (mobile phone) according to an embodiment of the present invention of FIG. 1.

Referring to FIG. 5, screen shot provided by CUD module icon and system 100, 500 downloaded on mobile device (mobile phone) according to an embodiment of the present invention of FIG. 1.

Referring to FIG. 6, screen shot provided by CUD module icon and system 100, 600 downloaded on mobile device (mobile phone) according to an embodiment of the present invention of FIG. 1.

Referring to FIG. 7, screen shot provided by CUD module icon and system 100, 700 downloaded on mobile device (mobile phone) according to an embodiment of the present invention of FIG. 1.

Figure 8:
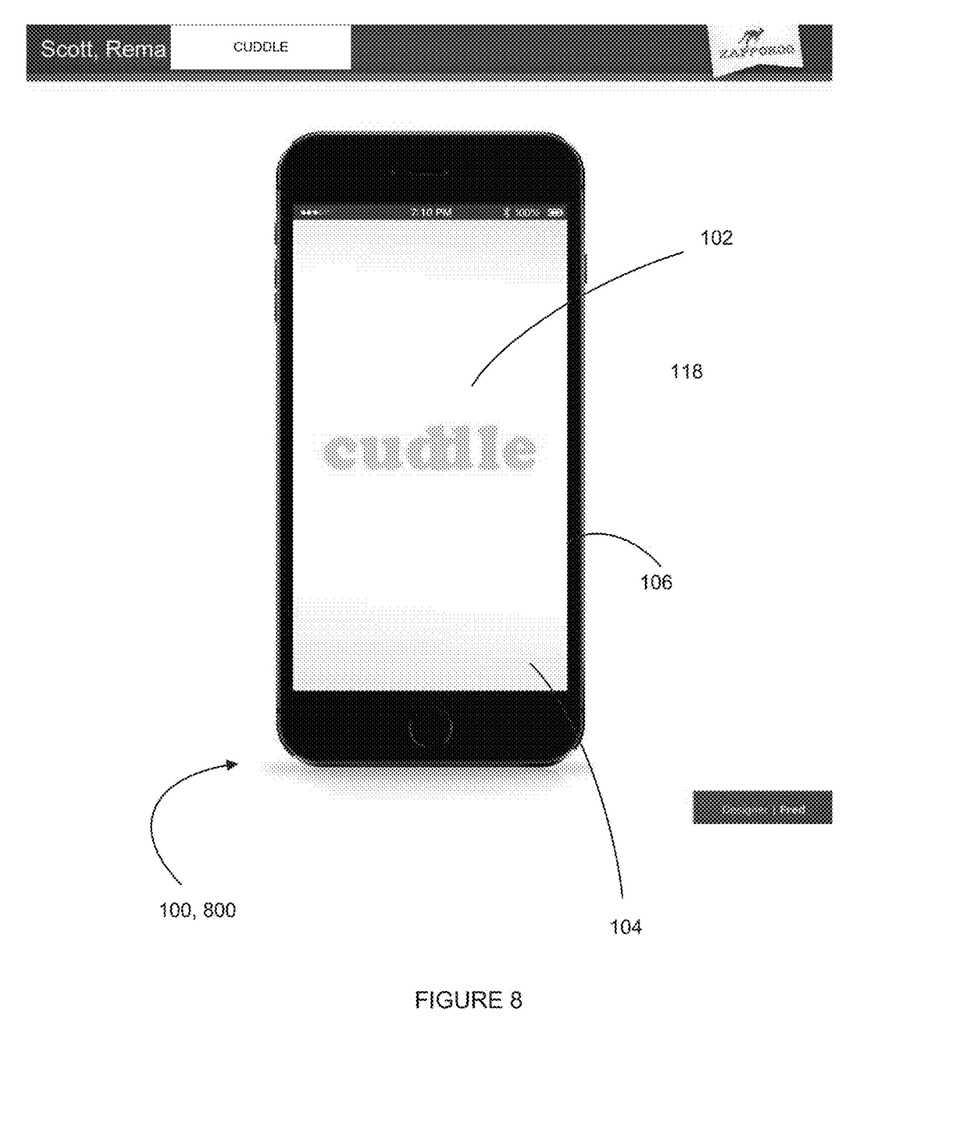
FIG. 8 illustrates screen shot provided by CUD module icon and system 100, 800 downloaded on mobile device (mobile phone) according to an embodiment of the present invention of FIG. 1.

Referring to FIG. 8, screen shot provided by CUD module icon and system 100, 800 downloaded on mobile device (mobile phone) according to an embodiment of the present invention of FIG. 1.

Figure 9:
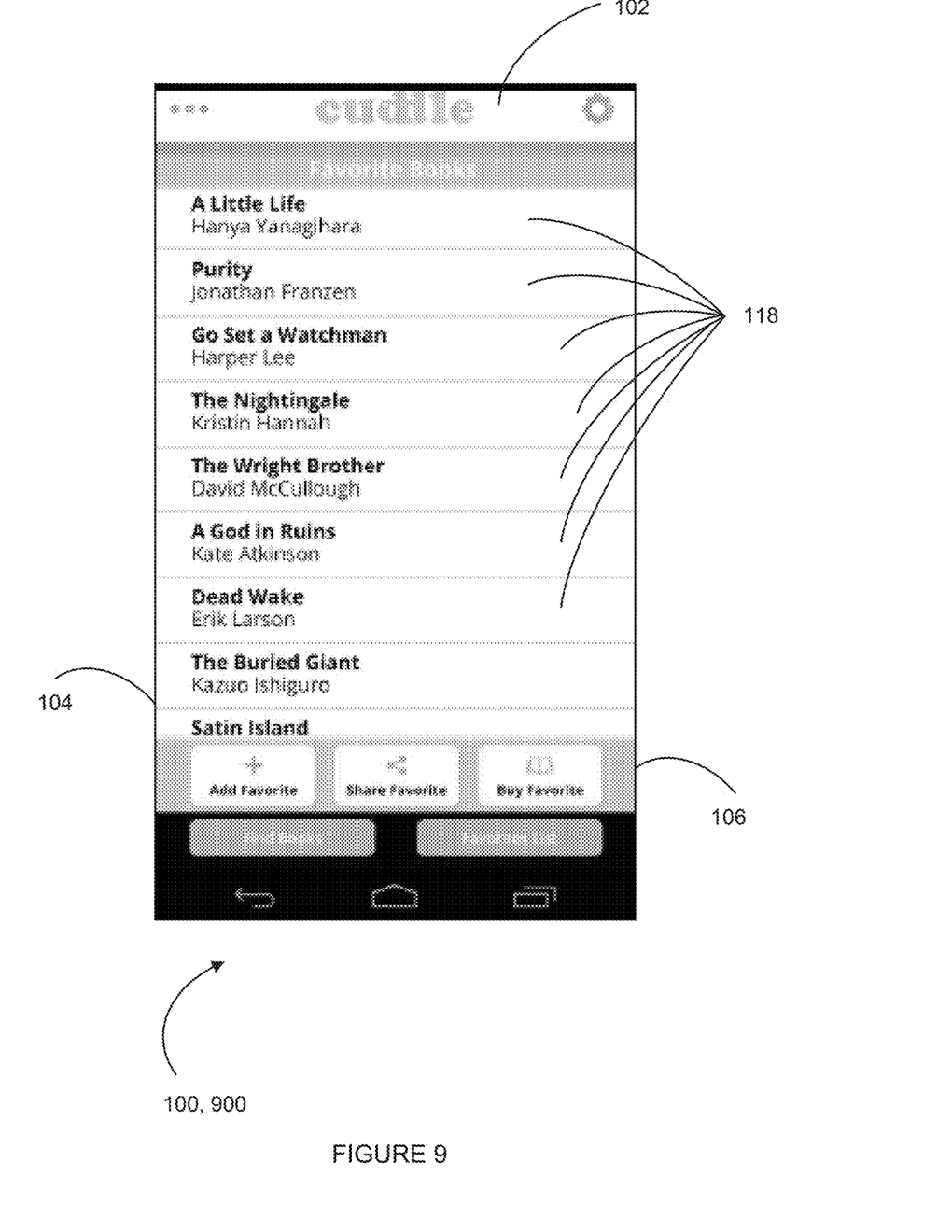
FIG. 9 illustrates screen shot provided by CUD module icon and system 100, 900 downloaded on mobile device (mobile phone) according to an embodiment of the present invention of FIG. 1.

Referring to FIG. 9, screen shot provided by CUD module icon and system 100, 900 downloaded on mobile device (mobile phone) according to an embodiment of the present invention of FIG. 1.

Figure 10:
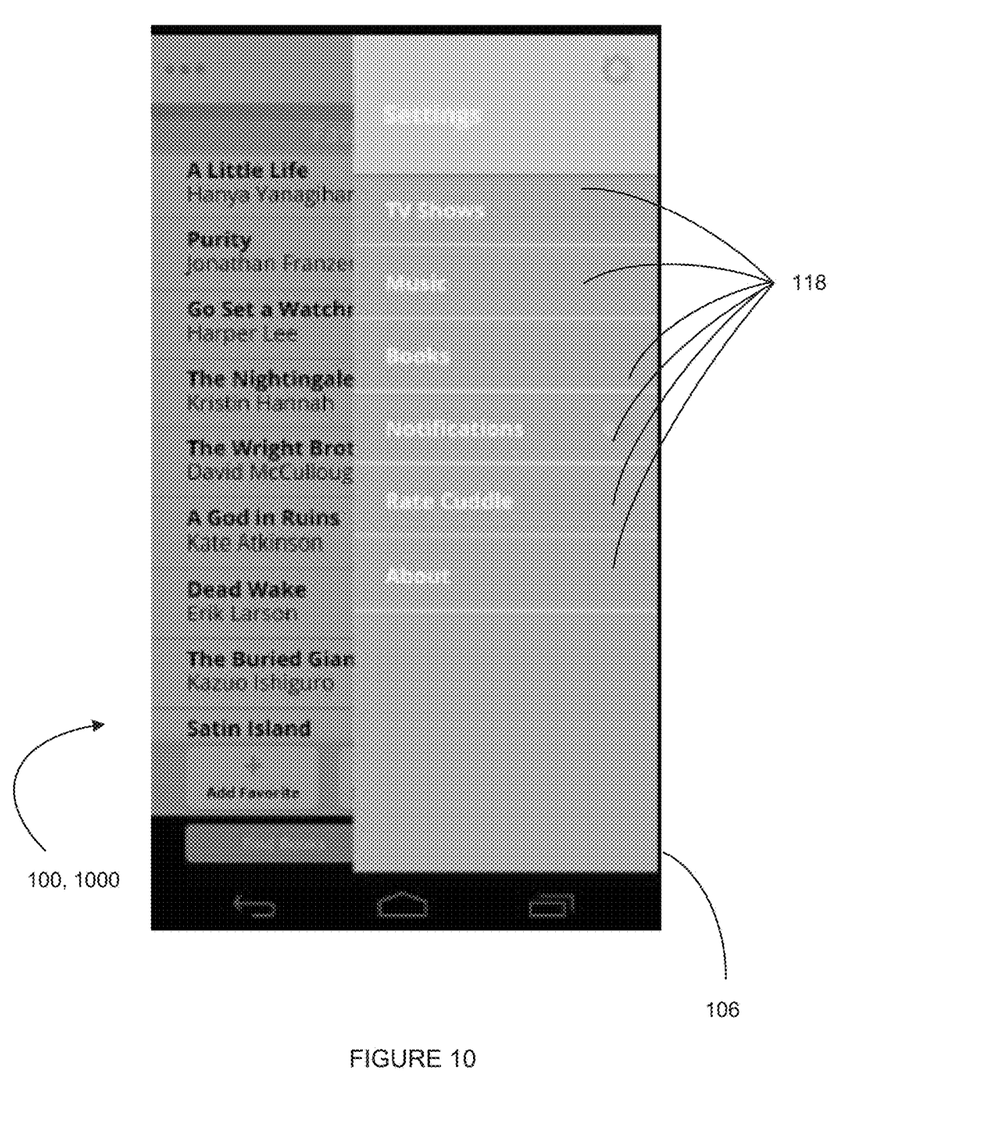
FIG. 10 illustrates screen shot provided by CUD module icon and system 100, 1000 downloaded on mobile device (mobile phone) according to an embodiment of the present invention of FIG. 1.

Referring to FIG. 10, screen shot provided by CUD module icon and system 100, 1000 downloaded on mobile device (mobile phone) according to an embodiment of the present invention of FIG. 1.

Figure 11:
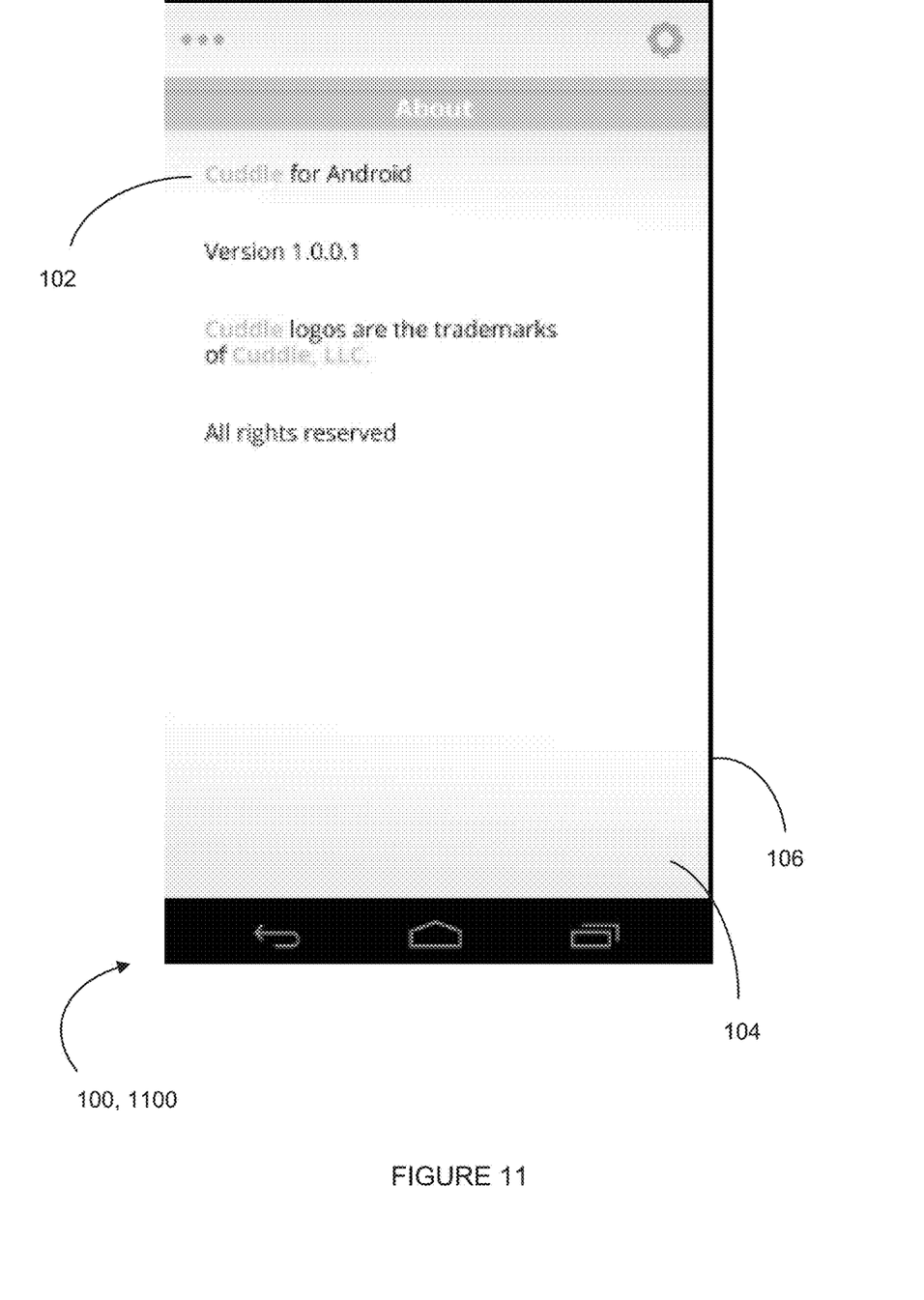
FIG. 11 illustrates screen shot provided by CUD module icon and system 1100 downloaded on mobile device (mobile phone) according to an embodiment of the present invention of FIG. 1.

Referring to FIG. 11, screen shot provided by CUD module icon and system 100, 800 downloaded on mobile device (mobile phone) according to an embodiment of the present invention of FIG. 1.

Figure 12:
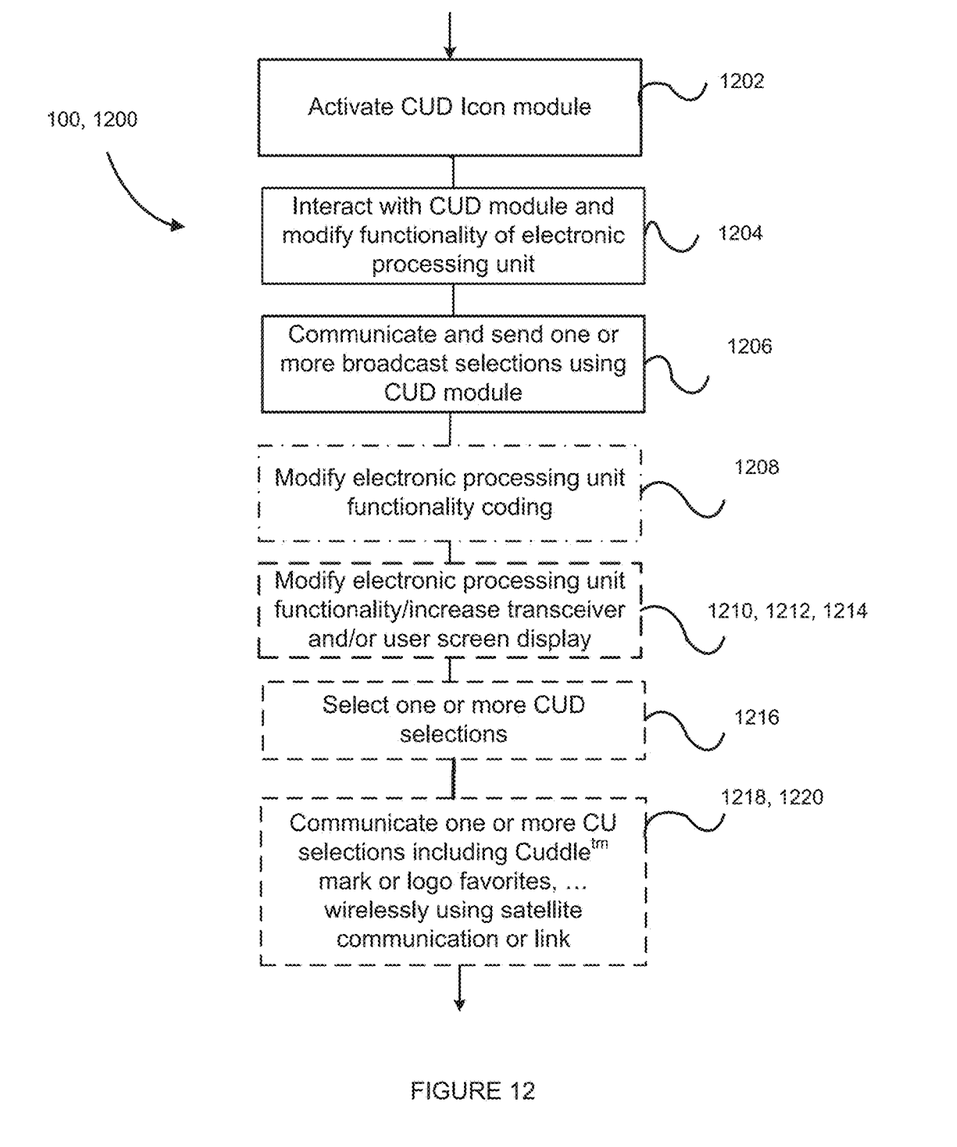
FIG. 12 is a flowchart illustrating a method of use for CUD module icon and system according to an embodiment of the present invention of FIGS. 1-11.

FIG. 12 is a flowchart illustrating a method of use for CUD module icon and system 100-1100 according to an embodiment of the present invention of FIGS. 1-11.

Referring now to FIG. 12, method 1200 of a Cuddle (CUD) system(s) 100-1100 on a user mobile phone 106 to view broadcast stations worldwide on a screen display 104.

In step 1202, CUD module icon 101 activates by user on screen display 104. In one example, receiving interactively by the CUD module 102 selections including genre of movies or shows, news, television stations, sports from the one or more broadcast stations. In step 1204, CUD module 102 selectively interacts with and modifies functionality of electronic processing unit 108 responsible for functionality of a transceiver module to select and automatically display a selected number of one or more broadcast selections from one or more CUD module selections on the user mobile device 106.

In step 1206, CUD module 102 communicate by pressing CUD module icon 101 on the screen display 104 portion of the selected number to a portion of the selected number of the one or more broadcast selections selected by CUD selection management module 111 responsive to selection by the user. For example, comprising selecting by the user a location including country or city for viewing at one of a genre of movies or shows, news, television stations, sports, and plays of the one or more broadcast stations and a list of options on a screen display for the user will appear to view. In another variation of step 1206, communicating by the user through the CUD module 102 searches, e.g., see FIGS. 4, 6, 7, for shows available for streaming by looking through various networks. For example, the user streams current shows and sporting events currently streamed by major networks including CBS, NBC, CNN, and ESPN and location including a country and a city for downloading, e.g., see FIG. 4.

In step 1208, CUD module 102 selectively interacts including modifying functionality of electronic processing unit 108 responsible for functionality of screen display module, transceiver module, or application 110 on user mobile device 106. In one instance, VA module 102 modifies central and auxiliary processing unit instruction sets for VA selection management module 111 on screen display 104 built-in user mobile device 106 in accordance with screen display module or transceiver module or application 110 in accordance with CUD module 102 coding requirements and/or one or more user instructions.

In step 1210, CUD selection management module 111 is modified in accordance with a specific mobile device module or application on screen display 104 or in accordance with user instructions or CUD module 102 instructions or coding.

In step 1212, electronic processing unit 108 modifies functionality includes one or more of central processing unit 108, device driver 104, display driver 104, screen display driver 104, or the like.

In step 1214, user touch screen display options increases includes providing CUD selection management module 111 including screen display 104 includes one or more CUD selections 118, screen menu provides for user moving fingers up, down, side to side or around screen display to select one or more CUD selections 118.

In step 1216, one or more CUD selections 118 include the one or more CUD selections include add a Share with Social Media Button on the Screen 119, e.g., see FIG. 7, wherein the user can share what they are currently watching across social media.

In step 1218, wherein the one or more CUD selections include a Cuddle tm mark or logo on a CUD webpage including any or all the following: a favorites books, settings, television shows, music, books, and notification(s) are communicated wireless 114, 116 with satellite communication or satellite link 112 to user on their mobile device 106.

In step 1220, comprising CUD selection management module 111 provides itemized information and other pertinent data relevant to one or more CUD selections selected for the user on user mobile device 106.

It should be noted that step(s) 1208-1220 is/are optional step(s) and may not be implemented in all cases. Optional steps of method 1200 are illustrated using dotted lines in FIG. 12 so as to distinguish them from the other steps of method 1200.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other Cuddle (CUD) system arrangements may be sufficient Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Those with ordinary skill in the art will now appreciate that upon reading this specification and by their understanding the art of mobile device modules or applications for Cuddle (CUD) system as described herein, methods of mobile device modules or applications for Cuddle (CUD) arrangements will be understood by those knowledgeable in such art.

What is claimed is new and desired to be protected by Letters Patent is set forth in the appended claims:

1. A mobile device that allows a user to view at least one broadcast station worldwide, comprising:
    a display screen;
    a main module icon adapted to be displayed on said display screen and adapted to interactively receive said at least one broadcast station selected by said user;
    a main module interactively coupled to said main module icon and adapted to selectively interact with and modify functionality of at least one electronic processing unit responsible for functionality of at least one of a transceiver module and a screen display module to select and automatically display said at least one broadcast station on said mobile device;
    wherein said at least one broadcast station is selected from a group of broadcast stations consisting of a movie station, a show station, a news station, a television station, or a sports station;
    wherein upon activation of said main module icon, said main module is adapted to communicate with a selected one of said at least one broadcast station by a main selection management module;
    wherein when said user selects a location for viewing said at least one broadcast station and a list of options are displayed on said screen display module for said user to view;
    wherein said user communicates through said main module and searches for shows available for streaming by looking through various networks for downloading;
    wherein said main module selectively interacts with and modifies functionality of said at least one electronic processing unit responsible for functionality of at least one of a transceiver module and a screen display module on said mobile device; and wherein said main module includes a modifying central and auxiliary processing unit instruction for said main selection management module in response to a selection by said user;
    wherein said main selection management module is adapted to be modified in accordance with instructions and electronic drivers and programming from said main module;
    wherein said at least one electronic processing unit includes at least one of a central processing unit, a device driver, a display driver, an electronic driver, a module, an application driver, and a screen display driver;
    wherein said main selection management module includes a screen viewable on said display screen and is adapted to provide said user the ability to move one or more fingers up, down, side to side, and around a screen menu to select the one or more broadcast station selections;
    wherein said user can share what they are currently watching across chosen social media;
    wherein said at least one broadcast station selection includes a Cuddle™ Mark or Logo identifying a CUD webpage, favorites books, settings, television shows, music, books, and notifications;
    wherein said at least one broadcast station selection is communicated wirelessly with a satellite communication or satellite link to said user on said mobile device; and
    wherein said at least one broadcast station selection is adapted to provide itemized information and other pertinent data relevant to said at least one broadcast station selected by said user on said mobile device.

* * * * *